United States Patent [19]

Hansen

[11] Patent Number: 5,353,564
[45] Date of Patent: Oct. 11, 1994

[54] THERMODYNAMIC AIR ENVELOPE FOR FOOD STORAGE STRUCTURE

[75] Inventor: Daniel B. Hansen, Nampa, Id.
[73] Assignee: Hansen-Rice, Inc., Nampa, Id.
[21] Appl. No.: 186,102
[22] PCT Filed: Jun. 18, 1990
[86] PCT No.: PCT/US90/03448
 § 371 Date: Oct. 10, 1991
 § 102(e) Date: Oct. 10, 1991

Related U.S. Application Data

[63] Continuation of Ser. No. 761,966, Oct. 10, 1991, abandoned.

[51] Int. Cl.$^5$ ............................................. F04B 2/28
[52] U.S. Cl. ............................. 52/407.1; 454/174; 454/186; 454/236
[58] Field of Search ............ 454/174, 186, 236; 52/1, 407.1, 407.2, 407.3, 407.5

[56] References Cited

U.S. PATENT DOCUMENTS

| | | |
|---|---|---|
| 979,444 | 12/1910 | De Armond ................... 454/174 |
| 3,303,770 | 2/1967 | Anthony ....................... 454/186 |
| 3,929,186 | 12/1975 | Becker ......................... 454/186 |
| 4,580,487 | 4/1986 | Sosnowski .................... 454/186 |

FOREIGN PATENT DOCUMENTS 2937071 4/1981 Fed. Rep. of Germany ...... 454/186
2294833 12/1987 Japan ................................ 454/186

OTHER PUBLICATIONS

"Insulation and Vapor Barriers in Potato Storage Buildings", by Henry Waelti, Pacific Northwest Extension Publication No. PNW 285 of Apr., 1987.

Primary Examiner—Carl D. Friedman
Assistant Examiner—Christopher Todd Kent
Attorney, Agent, or Firm—Laubscher & Laubscher

[57] ABSTRACT

A food storage building (10) having exterior wall surface (55) and exterior ceiling surfaces (65) held in spaced relationship with interior wall surfaces (64) and interior ceiling surfaces (64) to form interconnecting between wall and between wall cavities. Ventilation duct (41) is positioned within the between wall cavities around the base perimeter of wall systems (11). The ventilation duct (41) has a plurality of vent holes (42) for supplying heated or cooled forced air from heat source (40) to the between wall cavities for purposes of holding interior wall surfaces (54) and interior ceiling surfaces (64) above the drew point for the interior atmospheric conditions of food storage building (10).

7 Claims, 3 Drawing Sheets

THERMODYNAMIC AIR ENVELOPE FOR FOOD STORAGE STRUCTURE

This application is a continuation, of application Ser. No. 07/761,966, filed Oct. 10, 1991, now abandoned.

BACKGROUND OF THE INVENTION

1. Technical Field

This invention generally relates to an improved food storage structure of double wall construction having a between wall controlled atmosphere for purposes of controlling the surface temperature of the interior wall. More particularly it relates to a double wall construction system having a forced air heating and/or cooling system within a between wall air cavity for purposes of controlling the surface temperature of the interior wall in food storage buildings requiring relatively cool, high humidity, environments for food storage.

2. Background Art

There are a number of agricultural food products such as potatoes, onions, radishes, carrots, ginger root, artichokes, etc. which are placed into bulk storages after harvest and held from a few months to up to a year prior to processing. In general, the storage environment most suitable for holding these products with a minimum of rot, shrinkage, or other losses, is a relatively cool and very humid environment. For purposes of this disclosure, the potato and potato storage parameters are used as an example, however it should be noted that the problems associated with potato storage environments, and the principals of the present invention, are equally applicable to the storage of onions, carrots, radishes, and other food products requiring a cool and humid storage environment.

The potato tuber, when harvested from the ground, is a living, respirating, organism. The potatoes are dug from the ground and hauled, in trunks, in bulk, to a storage facility where they are piled, by means of movable conveyor belts, into piles 14 feet to 22 feet high atop of ventilation pipes or ducts as shown in FIG. 1. The typical potato storage in use today ranges in size from 5,000 square feet of earthen or concrete floor space to 65,000 square feet of earthen or concrete floor space, and will hold between 2,500 tons to 40,000 tons of potatoes. Since these potatoes are living, respirating organisms, there is approximately 2 BTU's per ton of potatoes, per day, of heat generated by the dormant potatoes, or, between 5,000 BTU's to 80,000 BTU's per day of heat generated. Thus, in temperate weather conditions, the problem is not one of keeping the potatoes warm, but rather one of keeping them cool.

In general, there are two means of cooling potatoes in common use today. The first, is generally described of the ventilation system, which uses outside ambient air and is suitable for holding potatoes in storage until late spring when the thermal load on the building from the potatoes within, and the outside atmosphere, increases to the point where a suitable storage environment can no longer be maintained. Where storages are designed to hold potatoes into hot summer months, refrigeration systems are added to the ventilation to provide a supplemental cooling.

The ventilation system, as is shown in FIG. 1, consists of a primary air recirculation system wherein cool humid air is blown into ventilation ducts positioned at the bottom of the potato pile. Air coming through the ventilation ducts escapes through vent holes in the pipes and filters up through the pile of potatoes into a return air plenum or is discharged directly to the outside atmosphere through exhaust dampers. The return air plenum usually has two discharge louvers, one to the outside atmosphere to exhaust hot air, and the second a recirculation louver which returns the air to the ventilation fans in the supply air plenum. Also provided is an outside air intake louver which can also be used to supply cool, fresh air to the ventilation fans. A control system is provided which monitors the discharge air temperature atop the potato pile in the vicinity of the return air louvers and a second sensor monitors outside air temperature. Thus, in relatively moderate temperature conditions, when the outside air temperature is below the desired storage temperature, the outside air louver is opened, either partially or fully, to provide a mixture of cool outside air with warmer inside air in the return air plenum, to provide potatoes with desired air temperature and control temperature within the storage.

For longer term storage, refrigeration systems are provided to cool the return air and the outside air intake louvers are closed.

These conventional potato storage systems work relatively well in moderate weather conditions. However, during extreme conditions, either hot or cold, the storage temperature parameters cannot always be maintained in the one to five feet adjacent to the outside walls of the storage.

As previously stated, for purposes of this disclosure the storage of potatoes is used as an example. Potatoes, depending upon their intended use, either for seed, for sale as fresh produce, or for processing into potato products, will require slightly different temperature and humidity parameters, with seed potatoes being stored at between 38° F. and 42° F., fresh potato product being stored between 42° F. and 46° F. and potatoes intended for use as frozen potato products or other processed potato products, being stored between 44° F. and 55° F. In all cases humidity in the storage, in order to minimize shrinkage, must be maintained above 90%, but under no circumstances at a saturated humidity wherein condensation occurs. There are a number of well known methods of injecting water vapor to elevate the humidity in the storage, with the most common being the use of air washers or centrifugal humidifiers which produce a vapor fog in the supply air plenum.

The reason why condensation in the potato pile is harmful relates to the problem of rot. Each potato when dug from the ground has on its skin, a culture of various microbes such as a bacteria and yeast. These organisms are relatively harmless to the stored potatoes as long as they remain on the surface of the skin, and, temperatures are maintained in the 38° F. to 55° F. range. However, during the harvesting process it is inevitable that a certain percentage of the potatoes harvested will be cut and bruised, thus breaking the surface skin of the potato and exposing the interior potato pulp to the microbial population, thus allowing the microbial population to multiply, causing potato rot. The rotting of one or two isolated potatoes, in and of itself, is not of any economic significance, however, condensing water vapor, dripping down through the potato pile from the ceiling and interior walls of the storage, provides a transport mechanism for transporting cultures of rot organisms from one potato to another, thus spreading the rot within the pile. Eventually, the softer, rotting potatoes will compress one against the other, thus restricting cooling air flow, and the result will be an explosion of the microbial population and a rapid spread of the rot throughout the pile of potatoes, thus forming what is in the industry is termed a "not spot" in the potato pile.

These hot spots are very difficult to detect, if for example they were to occur 7 feet down into the potato pile, 50 feed back from the access door. As a result, potatoes in storage are periodically monitored from an inspection catwalk located in the return air plenum, wherein the farmer or processor periodically monitors the local air temperature of the air exhausting from the top of the potato pile, and potato tuber pulp temperatures at a number of different locations throughout the storage. If a severely elevated exhaust temperature or pulp temperature is detected at any point in the pile, the storage must be immediately emptied to prevent loss of the crop.

As previously stated, the transmission of rot organisms from one potato to another is generally caused by condensate water dripping down through the pile. The elimination of condensation inside the storage is a difficult problem, and the solution of which is the primary object of this invention. At 46° F., and 96% of relative humidity, the dew point within the potato storage is 45.5° F., just 0.5° F. below the desired storage temperature, thus, if any surface temperature in the storage drops 0.5° F. below the interior atmosphere temperature, condensation on the walls and ceiling will occur and condensate water will drip onto and through the potato pile. Using conventional construction techniques, condensation on the interior surfaces of the potato storage building is a virtual certainty during cold winter months.

The typical potato storage construction technique in use today is to erect a post and beam or girder framework of steel or wood which is then sheathed with corrugated panels of steel. Urethan foam insulation is then sprayed onto the interior surface to provide an insulation and vapor barrier between the interior of the storage facility and the outside atmosphere. This can generally be described as a passive wall system wherein there will always be a temperature gradient and heat loss from the interior of the building to the outside atmosphere during conditions when the outside air temperature is lower than the inside air temperature. The temperature of the interior wall and ceiling surface will generally drop below the dew point when the outside atmosphere temperature is more than 20° F. below the inside storage temperature.

In addition, during prolonged, extreme cold weather conditions, the heat generated by the stored potatoes may be insufficient to maintain the interior storage temperature at the desired level in a steady state condition. In general, such extreme cold conditions are short term transients and the latent heat in the potato pile will hold the bulk of the potato pile at an acceptable storage temperature. However, it is not uncommon for those potatoes piled within a few feet of the exterior walls, to cool significantly below the desired storage temperature, and even freeze during extreme cold weather conditions. In the typical potato storage bin having dimensions of 120 feed long by 60 feet wide, with potatoes piled 16 feet high, within the storage, loss of the potatoes within 24 inches of the exterior walls will result in the loss of approximately 4% of the stored crop. This loss can occur even if the potatoes do not freeze. As in our example, if potatoes held for future processing into frozen french fires, are chilled below 36° F., the dormant potatoes will start converting stored starches to sugar for use as a fuel to generate heat to maintain proper temperature. Potatoes containing unacceptably high sugar contents will produce dark brown french fries due to the carmelization of the sugar during the frying process, and thus will not be suitable for processing. Obviously potatoes that are frozen in storage are not suitable for any use, and must be discarded.

At the other extreme, during unseasonably warm weather, the thermal load on the exterior of the building will heat the interior wall and will elevate the temperature in the vicinity of the interior wall to a point where the microbial cultures on the surfaces of the potatoes will becomes active and the populations will dramatically increase, thus initiating rot at the outside edges of the potato pile. Equivalent losses can be sustained from unseasonable warm weather as those from extreme cold temperatures.

Thus, the secondary objects of the present invention are to prevent the loss of stored potatoes from temperature variations due to extreme weather conditions, either cold or hot.

Accordingly, what is needed is a means of maintaining the interior wall surface of the food storage building above the dew point for the given storage temperature and humidity parameters during periods of time when the outside atmosphere temperature is below the desired storage temperature. Additionally, what is needed is a means of cooling the interior wall surface during periods of time when the outside air temperature is significantly above the desired interior storage temperature and humidity parameters.

SUMMARY OF THE INVENTION

These objects are accomplished by use of a construction technique which provides for an interior wall and ceiling surface and an exterior wall and ceiling surface with a between wall and ceiling air cavity. A forced air heating and/or cooling system is provided for directing ducted air to the base of the between wall cavity for supplying heated air to the between wall cavity during periods of time when the outside atmosphere temperature falls below the desired inside storage temperature in order to hold the interior surface temperature above the dew point of the storage atmosphere. And, during periods of time when the outside atmosphere temperature exceeds the interior storage temperature, for injecting cool air into the between wall air cavity for purposes of holding the interior wall surface temperature to an acceptably low temperature.

DETAILED DESCRIPTION

Figure 1:
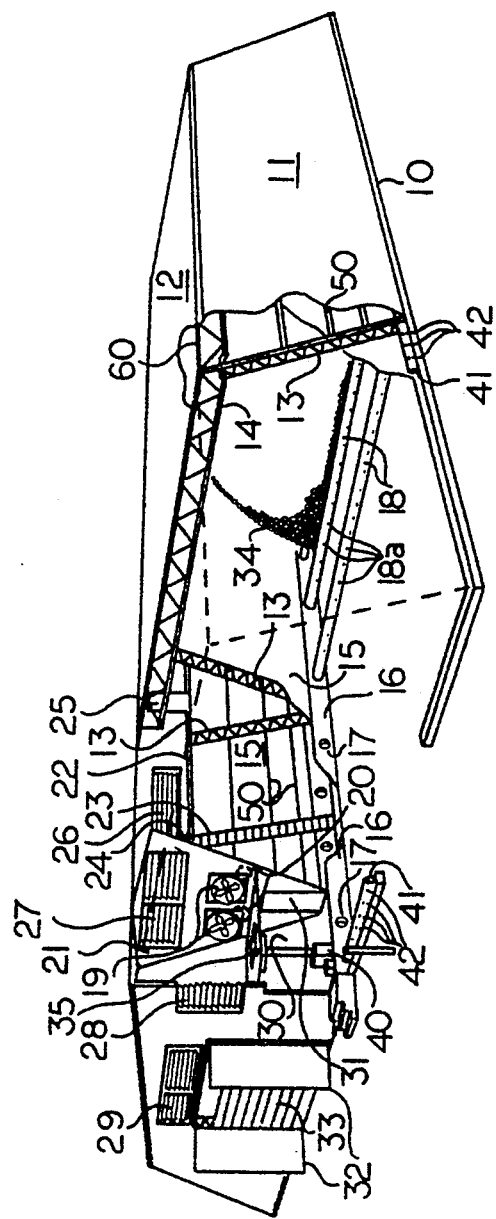
FIG. 1 is a perspective representation of a potato storage building.

A typical potato storage building 10 is shown and described in FIG. 1. Sidewalls 11 are constructed of sidewall truss columns 13 with interconnecting wall joist girts 50. The ceiling or top wall 12 is formed of roof truss girders 14 and interconnecting purlins 60. Two parallel storage bays are separated by central air plenum formed of plenum truss columns 13 with interconnecting girts 50 and plenum wall liners 15.

As previously stated in the background section of this specification, in moderate weather conditions, the issue is not that of keeping the stored potatoes 34 warm, but rather one of cooling them to the desired storage temperature. Also as previously stated, potatoes 34 piled in the storage bays are usually piled to a height of between fourteen to twenty-two feet. In order to keep these potatoes cooled to the desired storage temperature, air is ducted from the air supply plenum through holes 17 in concrete footing 16 into ventilation ducts 18 out through ventilation duct holes 18A into the bottom of potato pile 34 where it filters up through the pile, thereby cooling the potatoes. The central air plenum is divided into two sections, the lower one being the supply air plenum, and the upper the return air plenum, both of which are separated by divider floor 22. Air exhausted from the top of potato pile 34 either passes through return air louver 27 into the return air mixing chamber, or is exhausted to outside atmosphere through exhaust air louvers 29, depending upon outside air temperature and the temperature of the stored potatoes relative to the desired set point temperature. For example, if the desired storage temperature is 48° F., and the exhaust air filtering up through potato pile 34 is at 50° F., and outside air temperature is at 46° F., then some of the air rising from potato pile 34 will pass into the return air mixing chamber through return air louver 27, where it will be mixed with the cooler outside air drawn in through fresh air louver 28 to provide a supply air having a temperature of 47° F.

Ventilation fans 19 and humidifiers 20 are provided to drive humidified air throughout the circulation system.

Potatoes are loaded into the storage from field trucks through truck access doors 32, and as the storage fills, removable bulkheads 33 are positioned across the access doors to provide a temporary bulkhead against which the potato pile can rest during storage.

As stated in the prior art section of the specification, the temperature of air rising from the top of potato pile 34 must be carefully monitored to detect the presence of hot spots or sections of the potato pile 34 wherein rot is occurring. For this purpose, a plurality of crop inspection doors 25 and inspection catwalk 22 are provided in the return air plenum to give the person monitoring the storage access to the pile at various locations along its entire length in both storage bays. Access is gained to the crop inspection doors by means of trap door 24 in catwalk 22 and ladder 23. Access to the supply air plenum of course, is gained through plenum access door 31 from control room 30, and to the fans through trap door 35. Not shown are the louver control systems and the electrical control systems necessary to operate the ventilation system as these are well known in the art. Optional refrigeration evaporator coils 26 are positioned in return air plenum to cool return air.

Structurally, the side walls 11 are constructed of vertical sidewall truss columns 13 with interfitting horizontal wall joist girts 50 as shown in FIG. 1. The ceiling structure is formed of roof truss girders 14 together with interfitting joist purlins 60.

Figure 4:
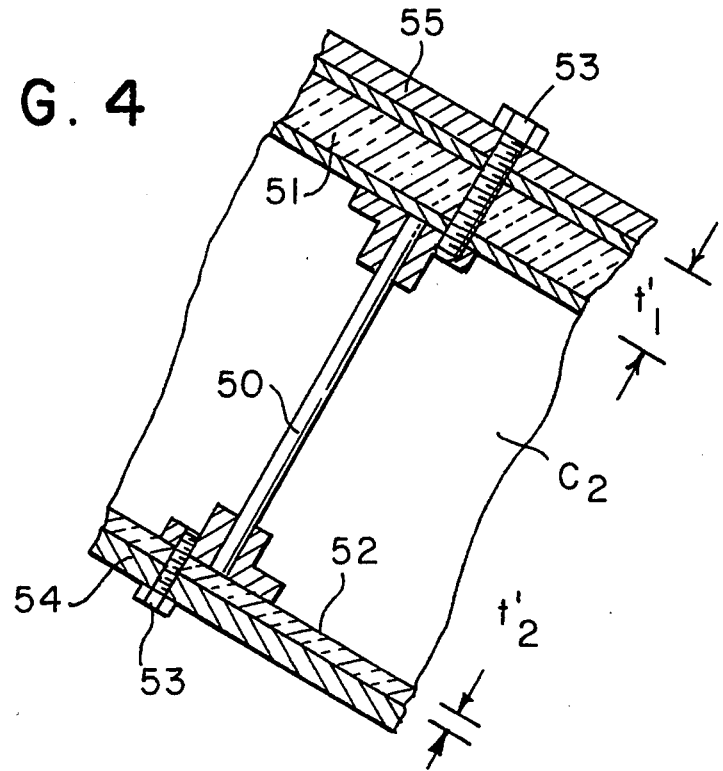
FIG. 4 is a sectional side view of a wall joist assembly.

As shown in FIGS. 1 and 4, the use of sidewall truss columns 13 and interfitting walls joist girders 50, when sheathed on both the interior and exterior, with innerwall liner 54 and outerwall panel 55, provides an air cavity $C_2$ which in and of itself is of some insulation value, but more importantly, is of importance to the present invention. Using conventional construction techniques as is described herein and described in FIG. 1, good care must be taken as shown in FIG. 4 to minimize the thermal heat sink path between innerwall liner 54 and the outside atmosphere. Typically, both the innerwall liner 54 and the outerwall panel 55 are formed of sheet metal, and if wall joist girt 50 were to be a direct mechanical connection, it would provide a metal heat sink path from the interior of the storage bay to the outside atmosphere and thus would provide a large plurality of localized points wherein the innerwall panel temperature would, during cool weather, almost continuously be below the dew point temperature of the storage bays, thus providing a significant number of condensation points on the innerwalls and ceiling of the storage bays.

In an effort to minimize the temperature differentials between these condensation points and the inside storage atmosphere, as shown in FIG. 4, outer insulation barrier 51 and inner insulation barrier 52 interfit between wall joist girt 50 and innerwall panel 54 and outerwall panel 55 to provide some thermal insulation in order to block the heat sink path. Innerwall liner 54 and outerwall panel 55 are both attached to wall joist girder 50 by means of offset fasteners 53 which are used to attach the panels to wall joist girt 50, thereby forming wall surfaces. Rigid insulation board will foil facing on both sides 51 is the primary wall insulation and vapor barrier.

Figure 3:
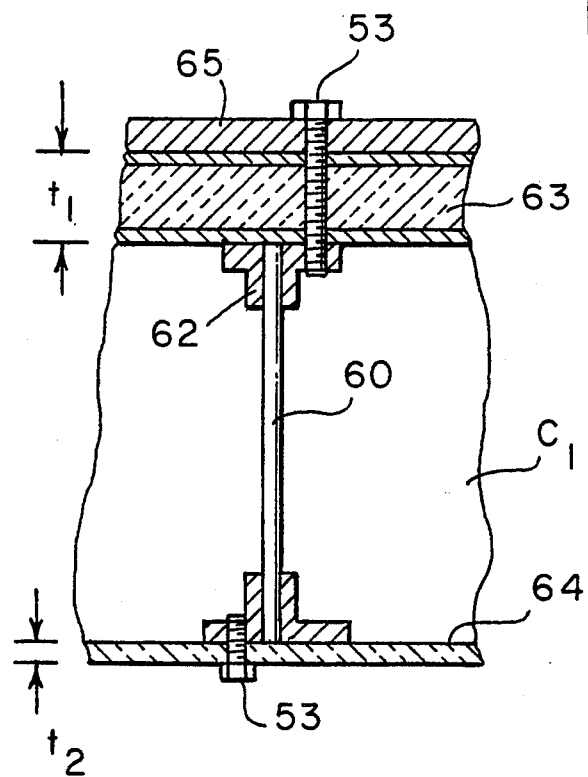
FIG. 3 is a sectional side view of a purlin assembly.

In a like manner, as shown in FIGS. 1 and 3, ceiling purlins 60 interconnect and interfit in a conventional manner between roof truss girders 14 to provide structural rigidity and support to roof system 12. Inner insulator 64, and outer insulator 63 are provided to minimize the heat sink path through ceiling purlins 60, which are attached, by means of angle supports 62, to the top chord of each of the roof truss girders. Roof panels 65 are then attached to top of outer insulator 63 to provide a weather tight roof system. Ceiling liner 64 is attached, using offset fasteners 53 to provide both a vapor barrier and a closed air cavity $C_1$ in roof system 12. Again, as in the case of sidewalls 11, rigid insulation board with foil facing on both sides 63 is the primary roof insulation. As shown in FIGS. 3 and 4, each outer insulation layer 63 and 51 has a thickness $(t_1, t_1')$ that is greater than the thickness $(t_2, t_2')$ of the associated inner insulation layer 64 and 54, respectively. Thus, the outer insulation layers are more resistive to thermal transfer than the corresponding inner insulation layers, respectively.

Ceiling liner 64 extends across the entire ceiling from sidewalls 11 of each storage bay and to the apex of ceiling over supply and return air plenums, thus providing for an enclosed between-wall cavity in both the side walls and ceiling areas adjacent to and above the storage bays where they are exposed to the outside atmosphere.

Even though great care is taken to minimize the heat sink paths created where innerwall liner 54 and ceiling liner 64 are fastened to or otherwise rest against the metal structures of sidewall truss column 13, wall joist girts 50, roof truss girders 14 and ceiling purlins 60, it has still been found that in practice, these points of contact will, because of the thermal conductivity characteristics of the structure itself, be cooled, during cold weather below the dew point for the particular desired storage environment. Thus, even in moderate weather, the interior surfaces of the storage bays are a structurally treated lattice work of said surfaces on which condensation can occur.

Figure 2:
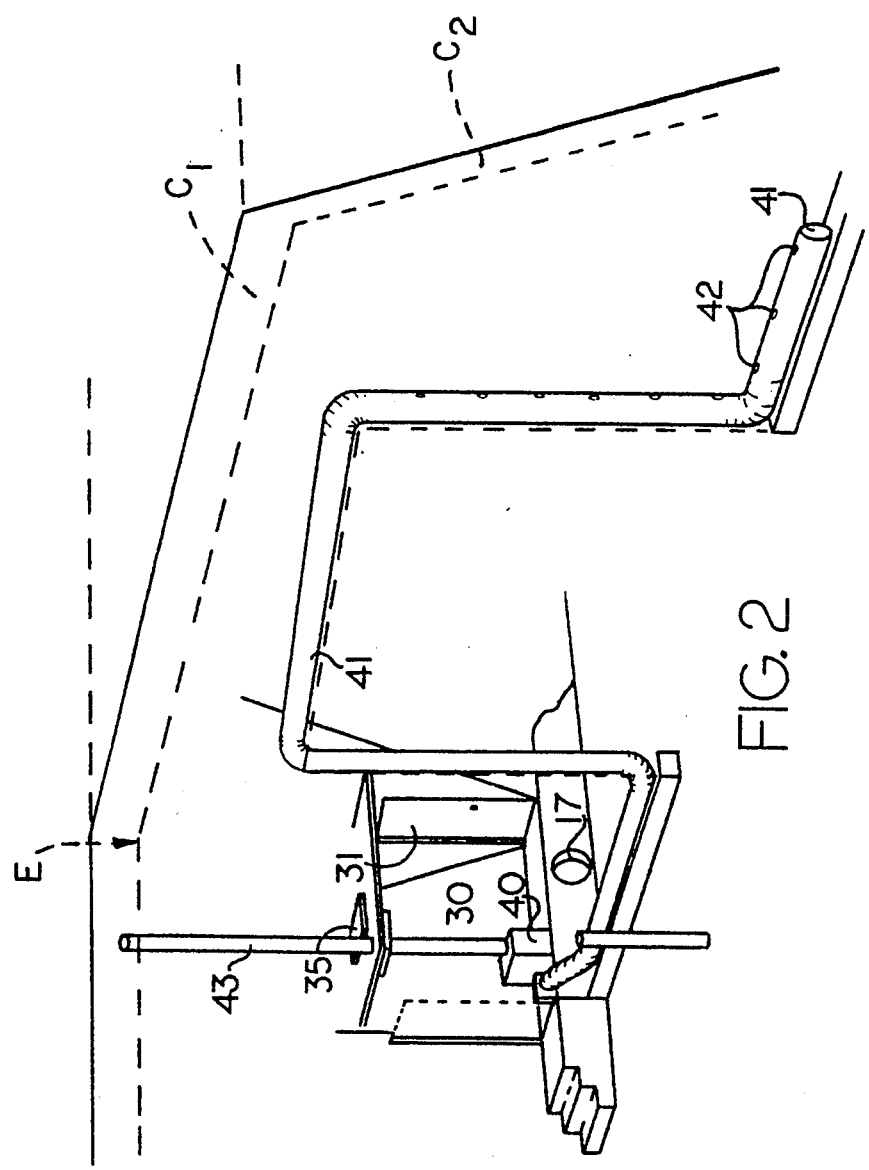
FIG. 2 is a perspective sectional representation of potato storage wall and the wall ventilation pipe.

The only effective way to eliminate this lattice work of condensation points is to heat the air in the between wall cavities of both the walls 11 and roof systems 12, as shown in FIGS. 1, 2 and 3.

Since ceiling liners 64, as shown in FIGS. 1, 2 and 4, extend from innerwall liners 54 to the apex of roof system 12, there is formed a totally enclosed air envelope E of the between wall and ceiling air cavities $C_2$ and $C_{12}$ respectively. Into this air envelope is installed wall ventilation ducts 41 around the perimeter of walls 11 as shown in FIG. 2. A plurality of wall vent holes 42 are provided in wall ventilation pipes 41 for ducting air, either heated or cooled, into the air envelope formed between the outerwall panels 55 and the innerwall liners of walls 11 and the roof panel 65 and ceiling liner 64. Heat source 40, situated in control room 30 is provided as a source of heated air for use for heating the air cavity so defined within the wall and ceiling structures. Air is returned to heat source 40 through air envelope return air duct 43 as shown in FIG. 2. A variety of heat sources 40 can be utilized ranging from conventional gas, oil or electric furnaces to heat pumps which can provide both heated and cooled air. The choice of which heat source 40 is selected is more dependant upon the availability of various fuels or energy sources, for example a potato storage constructed in South Texas will require a significantly more cooling or refrigeration capacity, than one constructed in the north of Maine or in Canada.

In a second embodiment, ceiling liner 64 only extends to plenum wall liners 15, air injected between wall ventilation pipe 41 circulates up through walls 11 and roof system 12 and is exhausted into the return air plenum, and is thereby returned into the main ventilation system as previously described. Thus in extreme cold conditions where no outside fresh air is being introduced into the system through fresh air louver 28, none of the heated air from heat source 30 is lost to the outside atmosphere, but rather is added to the total latent heat content of the building. And, in cases of extreme high temperatures where cooling is required, again, cool air being introduced into the between wall air cavity, is retained within the closed environment system of the storage.

The ability to inject heated air into the air cavity of walls 11 has also been found in practice to significantly moderate latent temperature losses which occur in the potato pile between the central portion of pile 34 where latent heat stored in the potatoes will hold them at the long term storage set point, and the temperature of the outside wall panels 55 which will be near equilibrium with outside atmosphere temperature during periods of prolonged cold weather. In practice it has been found that if the wall is strictly passive in its insulating capacity, that is to say no warm air is injected into the air cavity, eventually, the innerwall liners 54 will cool below the desired storage temperature set point, and in severe cases will actually drop below freezing. In such cases of prolonged cold weather, the heat generation capacity of the potato pile may be insufficient to hold the temperature set point within the storage bays, and the outer edges of potato pile 34, adjacent to outerwalls 11 will cool. In our example, where potatoes are being held for further processing into frozen potato products, if the potatoes adjacent to the exterior walls 11 drop below 43° F., the dormant potatoes will start converting storage starches to sugars, thus rendering them unsuitable for the desired processing. In practice, it is not an uncommon occurrence for not only the loss of potatoes due to cooling below desired set points, but actual freezing. During prolonged periods of cold weather, it is not uncommon to have all of the potatoes within five feet of the exterior walls actually freeze, thus rendering them useless for any purpose other than the production of methane. However, by injecting warm air into the air cavity, this type of a loss can be prevented.

While there is shown and described the present preferred embodiment of the invention, it is to be distinctly understood that this invention is not limited thereto but may be variously embodied to practice within the scope of the following claims.

I claim:

1. A food storage building for storing potatoes or the like, comprising:
    (a) means including side (11) and top (12) walls defining an enclosed food storage chamber, at least one of said walls being formed of sheet metal;
    (b) means defining an air envelope (E) adjacent the inner surfaces of said side and top walls for at least partially enclosing said food storage container, including:
        (1) pairs of parallel spaced outer (51,63) and inner (52,64) layers of thermal insulating material said pairs of layers defining cavities ($C_2,C_1$) therebetween;
        (2) at least one layer of each pair being lined with metal foil;
        (3) the thickness ($t_1$, $t_2'$) of the outer layer of each pair of being greater than the thickness ($t_2,t_2'$) of the inner layer of each pair, thereby to cause the outer layers to be more resistive to thermal transfer than said inner layers; and
        (4) means (53, 62, 60, 50) connecting said insulating layers with said side and top walls; and
    (c) controlled temperature circulating means (30, 40, 41) for circulating through said air envelope air having such a controlled temperature relative to the ambient temperature and to the temperature and humidity conditions within said food storage chamber as to maintain the temperature of said inner insulating layers above the dewpoint temperature of the storage atmosphere.

2. Apparatus as defined in claim 1, wherein said controlled temperature air circulating means includes a forced air heating system.

3. Apparatus as defined in claim 1, wherein said controlled temperature air circulating means includes a forced air cooling system.

4. The food storage building as defined in claim 2, wherein said air envelope includes adjacent its lower edge a base perimeter portion; and further wherein said forced air heating system includes:
    (1) a forced air furnace (40); and
    (2) a ventilation duct (41) connected with said furnace and extending in said envelope base perimeter portion, said ventilation duct containing a plurality of ventilation apertures (42) for introducing heated air into the lower perimeter portion of said air envelope.

5. The food storage building of claim 4 which is further characterized by means for returning forced air from the between wall cavity to the forced air furnace.

6. A food storage building as defined in claim 1, wherein said controlled temperature air circulating means includes means for maintaining air temperatures in said food storage area below 55° F. and a humidity greater than 90%.

7. A food storage building, for storing potatoes or the like, comprising:
   (a) means including side (11) and top (12) walls defining an enclosed food storage chamber, at least one of said walls being formed of sheet metal;
   (b) means defining an air envelope (E) adjacent the inner surfaces of said side and top walls for at least partially enclosing said food storage container, including:
      (1) pairs of parallel spaced outer (51,63) and inner (52,64) layers of thermal insulating material, said pairs of layers defining cavities ($C_2, C_1$) therebetween;
      (2) the thickness ($t_1, t_1'$) of the outer layer of each pair being greater than the thickness ($t_2, t_2'$) of the inner layer of each pair, thereby to cause the outer layers to be more resistive to thermal transfer than said inner layers; and
      (3) means (53, 62, 60, 50) connecting said insulating layers with said side and top walls; and
   (c) controlled temperature circulating means (30, 40, 41) for circulating through said air envelope air having such a controlled temperature relative to the ambient temperature and to the temperature and humidity conditions within said food storage chamber as to maintain the temperature of said inner insulating layers above the dewpoint temperature of the storage atmosphere.

* * * * *